United States Patent [19]

Miller

[11] Patent Number: 5,895,219

[45] Date of Patent: Apr. 20, 1999

[54] APPARATUS AND METHOD FOR TEACHING READING SKILLS

[76] Inventor: Lauren D. Miller, 12417 Stillwater Terrace Dr., Tampa, Fla. 33624-4738

[21] Appl. No.: 08/895,442

[22] Filed: Jul. 16, 1997

[51] Int. Cl.⁶ .................................................. G09B 17/00
[52] U.S. Cl. .............................. 434/178; 283/46; 434/172
[58] Field of Search ..................................... 434/178, 156, 434/167, 170, 172; 283/46

[56] References Cited

U.S. PATENT DOCUMENTS

| 2,862,309 | 12/1958 | Von Der Hellen . | |
|---|---|---|---|
| 2,946,137 | 7/1960 | Worth et al. . | |
| 4,702,700 | 10/1987 | Taylor | 434/168 |
| 5,447,439 | 9/1995 | Nathanson | 434/346 |
| 5,474,456 | 12/1995 | Parken | 434/178 |

*Primary Examiner*—Jeffrey A. Smith
*Attorney, Agent, or Firm*—Ronald E. Smith

[57] ABSTRACT

A storyboard includes a sentence imprinted on it that has at least one missing word, and a hook and loop fastener is positioned in registration with the missing word. A plurality of mounting members, each of which has a word imprinted on its front side, is stored at a location remote from the storyboard and is detachably secured to a hook and loop fastener. A child selects a word from the remote location and attaches it to the hook and loop fastener on the storyboard to complete the sentence. The child then inverts the mounting member and views a picture on its reverse side to verify the meaning of the word. In a second embodiment, remote mounting members having words or pictures imprinted on them are stored under flaps that surround the storyboard and the child sequentially lifts the flaps, retrieves mounting members having words and pictures imprinted on them, and completes a sentence. The mounting members are then inverted to view pictures and words on their respective reverse sides that confirm the words and pictures imprinted on their respective front sides.

9 Claims, 6 Drawing Sheets

APPARATUS AND METHOD FOR TEACHING READING SKILLS

BACKGROUND OF THE INVENTION

1. Field of the Invention

This invention relates, generally, to a teaching aid. More particularly, it relates to a device that engages the attention of young children learning to read and to a method for using the device.

2. Description of the Prior Art

Learning to read may be difficult for some young children because the printed word appearing on a page does not appear particularly attractive or interesting to them. If a child finds black letters written on a white page to be uninteresting, his or her reading skills will develop very slowly and perhaps not at all.

Many children who are not attracted to traditional reading material are physically oriented and prefer to manipulate items with their hands instead of abstract symbols in their minds.

What is needed, then, is a method and apparatus for teaching reading skills to young children that attracts and holds their interest. The apparatus should include bright colors and attractive pictures. Moreover, it should involve young readers in physical activity related to the reading process so that the learning process is not exclusively mental.

However, in view of the art considered as a whole at the time the present invention was made, it was not obvious to those of ordinary skill in this art how a new method and apparatus for teaching reading skills could be provided.

SUMMARY OF THE INVENTION

The longstanding but heretofore unfulfilled need for an apparatus and method that overcomes the limitations of the prior art is now met by a new, useful, and nonobvious invention that is based upon the insight that children like bright colors and pretty pictures. They also like to take things apart and put them back together again with their hands. They even like to open and close flaps. Moreover, they enjoy fastening and unfastening things that are secured to one another by hook and loop fasteners.

A first embodiment of the invention thus includes a method for teaching reading skills that includes the steps of imprinting a partial sentence on a substrate, where the partial sentence has at least one omitted word, permanently affixing a fastening means on the substrate at the location of the at least one omitted word, providing a plurality of mounting members, imprinting a first preselected indicia, preferably in pictorial form, on a first side of each mounting member, imprinting a second predetermined indicia, preferably in textual form, on a second side of each mounting member, providing a fastening means on the second side of each mounting member where the fastening means is adapted for detachable engagement with the fastening means permanently affixed to the substrate, where at least one mounting member of the plurality of mounting members has an indicia imprinted on said first side that grammatically completes the partial sentence when the at least one mounting member is detachably secured to the fastening means, and storing each of the mounting members at a location remote from the sentence so that a child learning to read must first retrieve a selected mounting member from the remote location prior to detachably securing the selected mounting member to the permanently affixed fastening means.

A second method of this invention adds the step of covering the mounting members with flaps so that a child must open the flaps to gain access to them.

It is a primary object of this invention to provide a tool that teachers can use to teach young children how to read.

Another object is to provide a tool that appears to children as a toy and which attracts and holds their attention.

Still another object is to provide a teaching tool that physically involves children in the learning process so that such process is not entirely mental.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
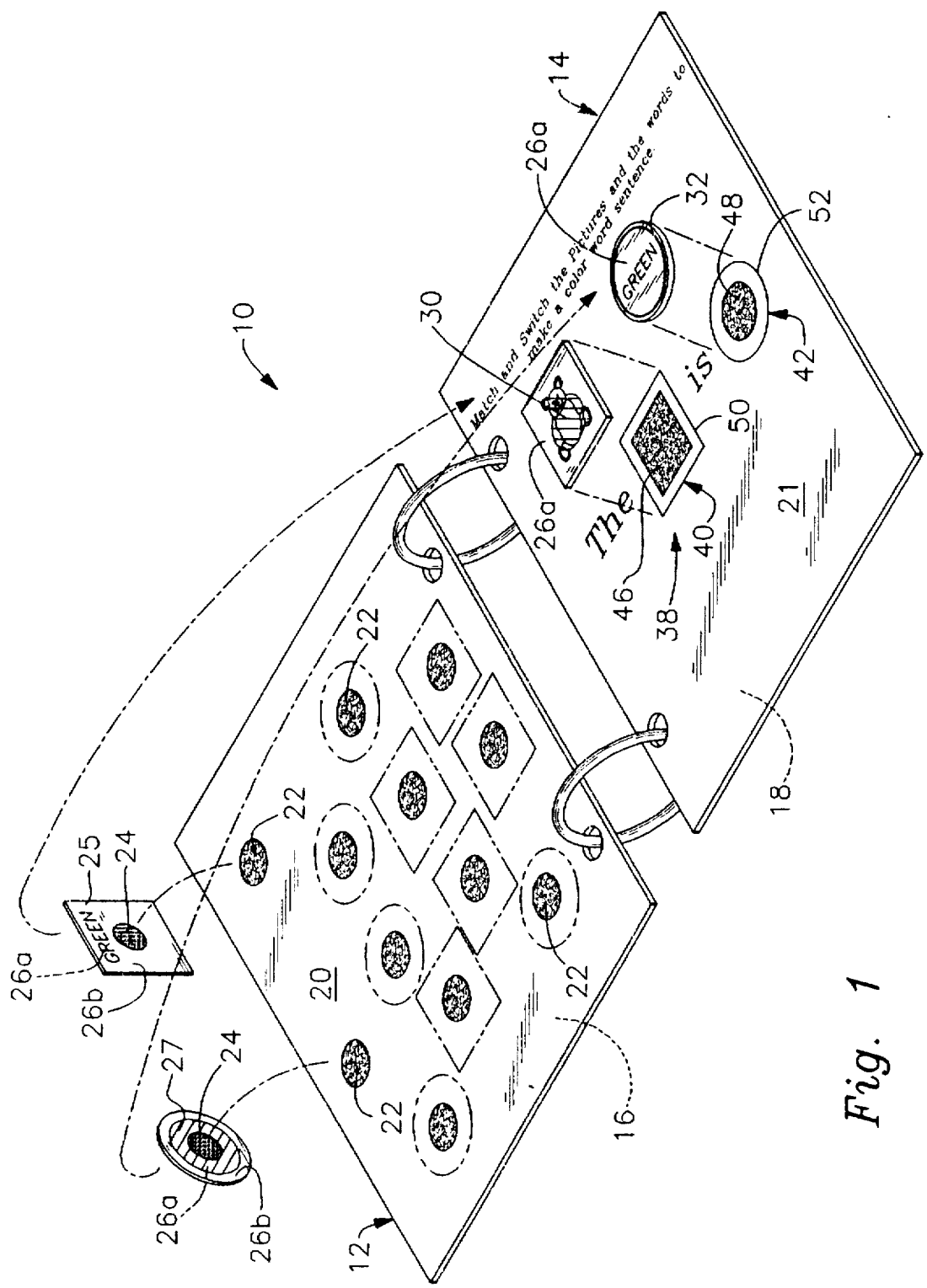
FIG. 1 is an exploded perspective view of a first embodiment of the invention.
Figure 2:
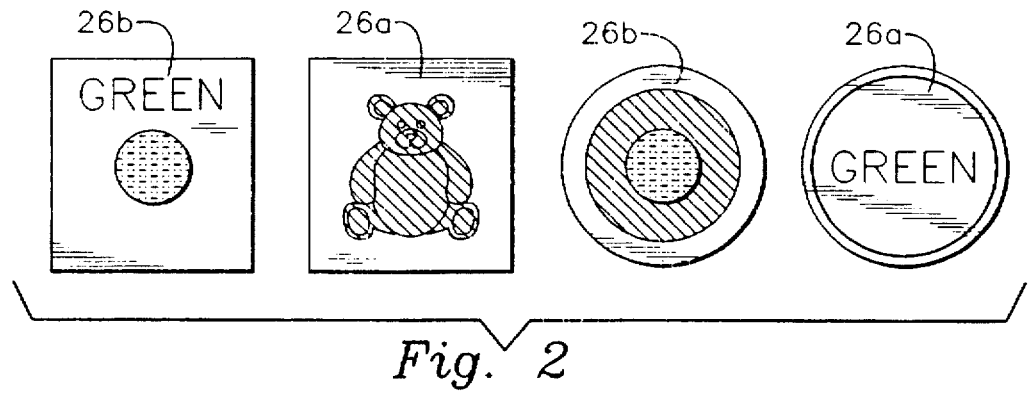
FIG. 2 is a composite elevational view of the reverse and forward sides, respectively, of a picture-containing mounting member of a first color and of a word-containing mounting member.
Figure 3:
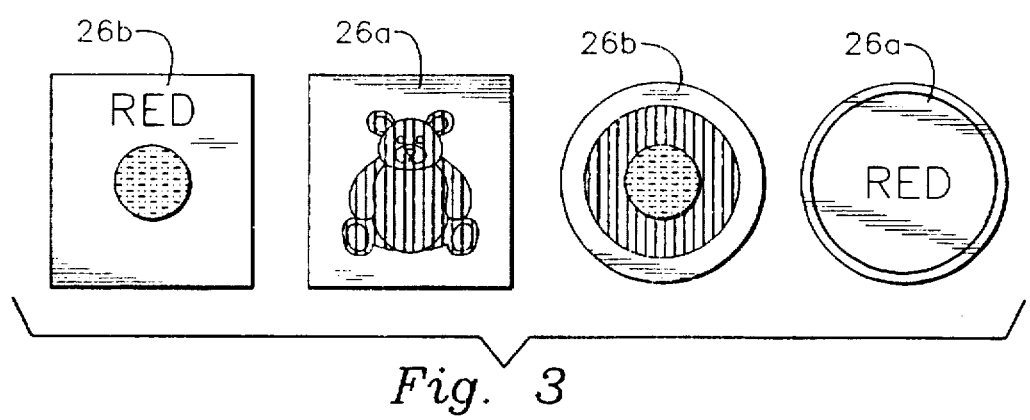
FIG. 3 is a composite view of the reverse and forward sides, respectively, of a picture-containing mounting member of a second color and of a word-containing mounting member.
Figure 4:
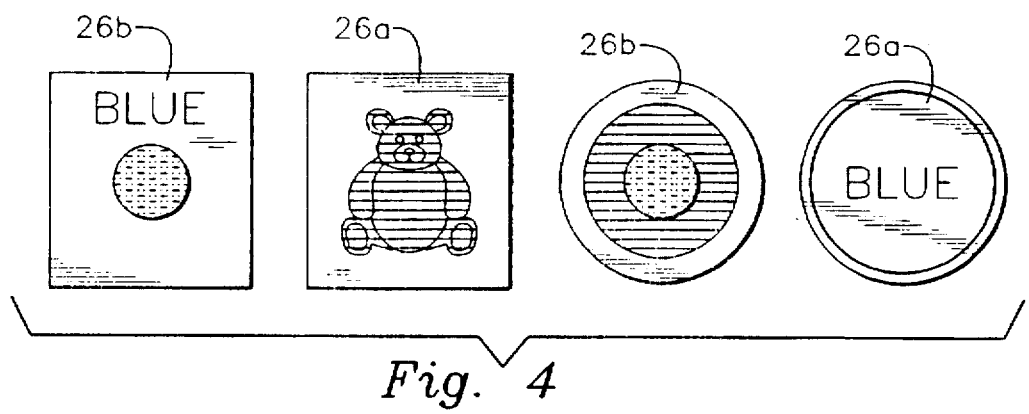
FIG. 4 is a composite view of the reverse and forward sides, respectively, of a picture-containing mounting member of a third color and of a word-containing mounting member.
Figure 5:
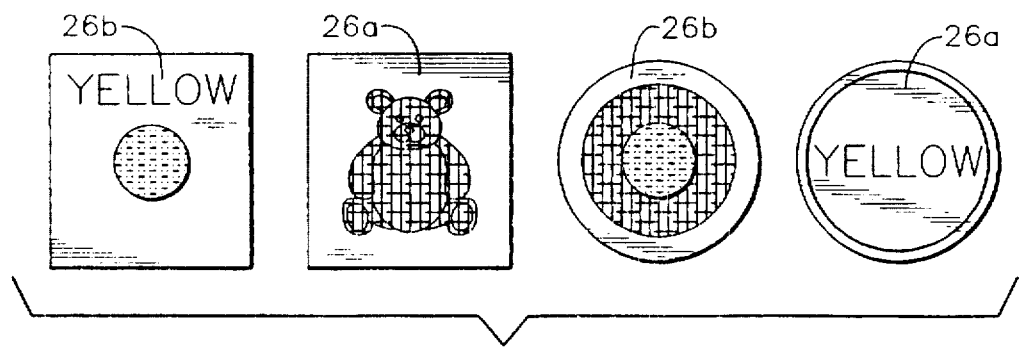
FIG. 5 is a composite view of the reverse and forward sides, respectively, of a picture-containing mounting member of a fourth color and of a word-containing mounting member.
Figure 6:
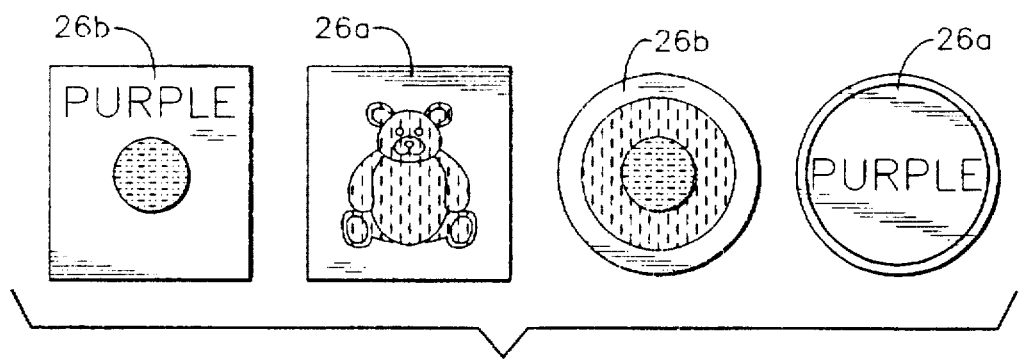
FIG. 6 is a composite view of the reverse and forward sides, respectively, of a picture-containing mounting member of a fifth color and of a word-containing mounting member.
Figure 7:
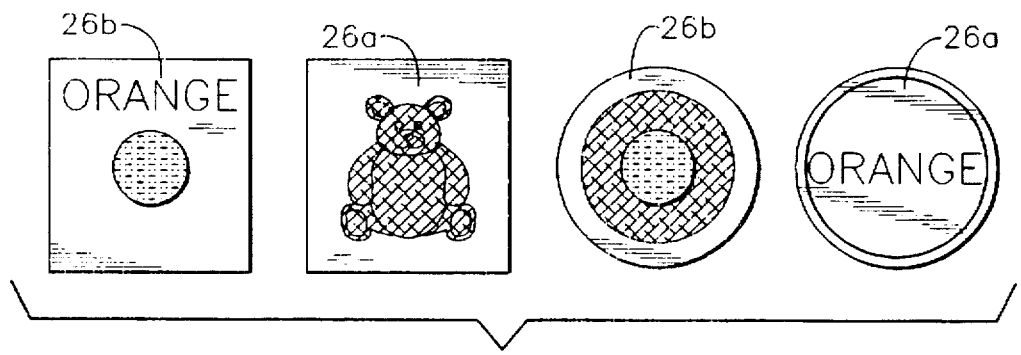
FIG. 7 is a composite view of the reverse and forward sides, respectively, of a picture-containing mounting member of a sixth color and of a word-containing mounting member.

Referring now to FIGS. 1–7, and primarily to FIG. 1, it will there be seen that an exemplary embodiment of the invention is denoted as a whole by the reference numeral 10.

In this first embodiment, the novel teaching method is embodied in the form of a book 10 having a front cover 12 and a back cover 14. Front cover 12 has a front side 16 upon which is imprinted the title of the work and other information that forms no part of the invention, per se.

Similarly, back cover 14 has a rear side 18 upon which is imprinted informational material that forms no part of the invention, per se.

Front cover 12 further includes an inside surface 20 upon which is permanently attached a plurality of fastening means, collectively denoted 22. Fastening means 22 detachably mate with complementarily formed fastening means 24 that are respectively affixed to a second or reverse side 26b of mounting members 26. Each mounting member 26 further includes a front side 26a upon which is imprinted a first preselected indicia such as a picture 30 or a word 32. In this example, all picture-containing mounting members are square or rectangular in shape and all word-containing mounting members are circular, i.e., round. As indicated in FIGS. 2–7, the pictures are in bright, attractive colors, and the printed matter or textual material is printed in an easy-to-read font.

Significantly, a preselected indicia such as a word 25 is imprinted on the reverse side 26b of each square mounting member, and a preselected color 27 is imprinted on the reverse side 26b of each circular mounting member.

A sentence 38 containing at least one space 40 representing a first missing word and, preferably, a second space 42 representing a second missing word is imprinted upon inside surface 21 of back cover 14. A fastening means 46, 48 is respectively permanently affixed to first and second spaces 40 and 42, said fastening means being square and round, respectively, to indicate the shape of the mounting member to be detachably secured thereto.

In this illustrative embodiment, the fastening means 46, 48 are respectively bounded by a first preselected geometrical figure such as a square or rectangle 50 and a second preselected geometrical figure such as a circle 52 as depicted. This tells the child that a square or rectangular, picture-containing mounting member 26 is to be detached from the inside surface 20 of cover 12 and affixed to square fastening means 46 that is bounded by said square, and that a circular, word-containing mounting member 26 is to be removed from said inside page and mounted upon circular fastening means 48.

A child, under the instruction of a teacher, selects a square mounting member 26 at random, removes it from its mounting means 22 on inside surface 20 of front cover 12, and attaches it to square fastening means or fastener 46 on inside surface 21 of rear cover 14. Suppose the child selects a green bear from surface 20 and places it within square 50 on mounting means 46 on surface 21. The teacher then reads the following sentence to the child: "The bear is ..." and asks the child the color of the bear. If the child answers with an incorrect color, the adult teaches the child the correct answer. When the child understands that the selected bear has a green color, the child is then asked to find the round mounting member 26 on surface 20 that has the word "green" written on first side 26a thereof. When the child successfully locates the mounting member having "green" imprinted thereon, the child removes that mounting member from its mount 22 on inside surface 20 of front cover 12 and attaches it to round fastening means 48 on surface 21. The adult then reads the entire sentence and encourages the child to do so as well. The child is then instructed to turn the bear mounting member 26 over, and to read the word imprinted on the reverse side 26b thereof, which word is "green." This gives the child a reinforcement as to what the printed word "green" looks like. The child is then instructed to invert the round mounting member 26; the reverse side 26b of said round mounting member will have a green indicia thereon. This provides still another reinforcement of the word that has been learned.

After this process has been explained by the teacher one or more times, the child will be able to construct a large number of sentences on his or her own. The child will like the looks of the bears or other animals and the colors with which they are drawn. The child will also like the sound made when removing a mounting member from its hook and loop-type fastening means. After a sentence has been constructed, the child will enjoy turning over the square and round pieces to verify the color of the respective mounting members in printed material and in actual colors on the square and round mounting members, respectively.

Once a child has mastered the above-described first embodiment of this invention, the child is then ready to further advance his or her reading skills by using the second embodiment, depicted in FIGS. 8–13.

The creative storyboard 60 of this embodiment includes a first flap 62 denoted "Pictures" and "1," a second flap 64 denoted "Words" and "2" with the "2" being encircled, a third flap 66 denoted "Pictures" and "3," and a fourth flap 68 denoted "Words" and "4" with the "4" being positioned within a triangle.

Each flap 62, 64, 66, 68 has a reverse side 62a, 64a, 66a, 68a upon which is respectively mounted a piece of hook and loop fastening material 62b, 64b, 66b, 68b. Each of said pieces releasably engages a respective complementary piece of fastening material 62c, 64c, 66c, 68c that is permanently secured to a substrate 70 in registration therewith so that the flaps are held closed when said opposing hook and loop fasteners are engaged to one another and so that said flaps may be easily opened by a child by selectively separating the mating pieces from one another.

Figure 8:
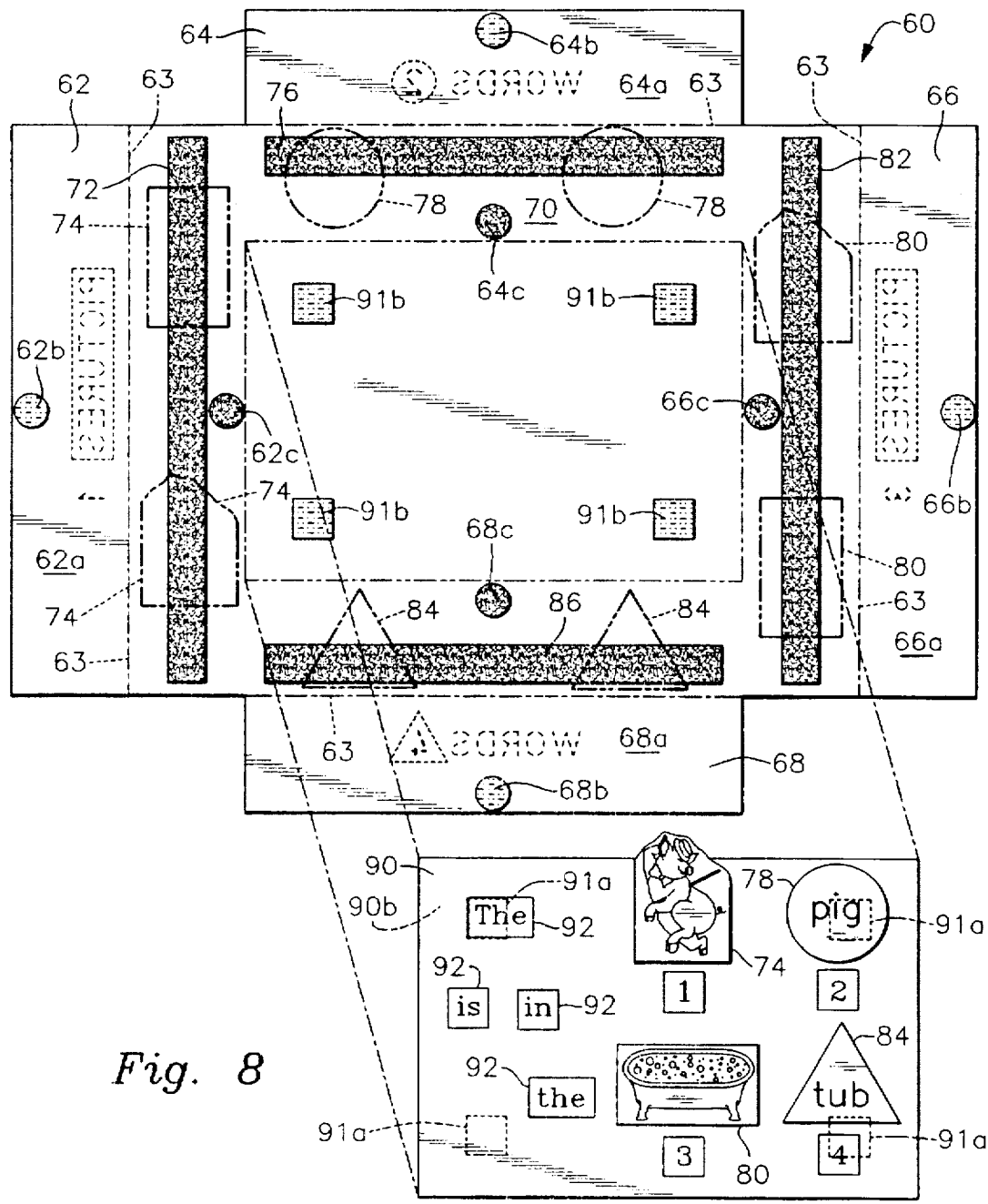
FIG. 8 is an exploded elevational view of a second embodiment of the invention, depicting the novel storyboard in its detached relation to the novel substrate.
Figure 9:
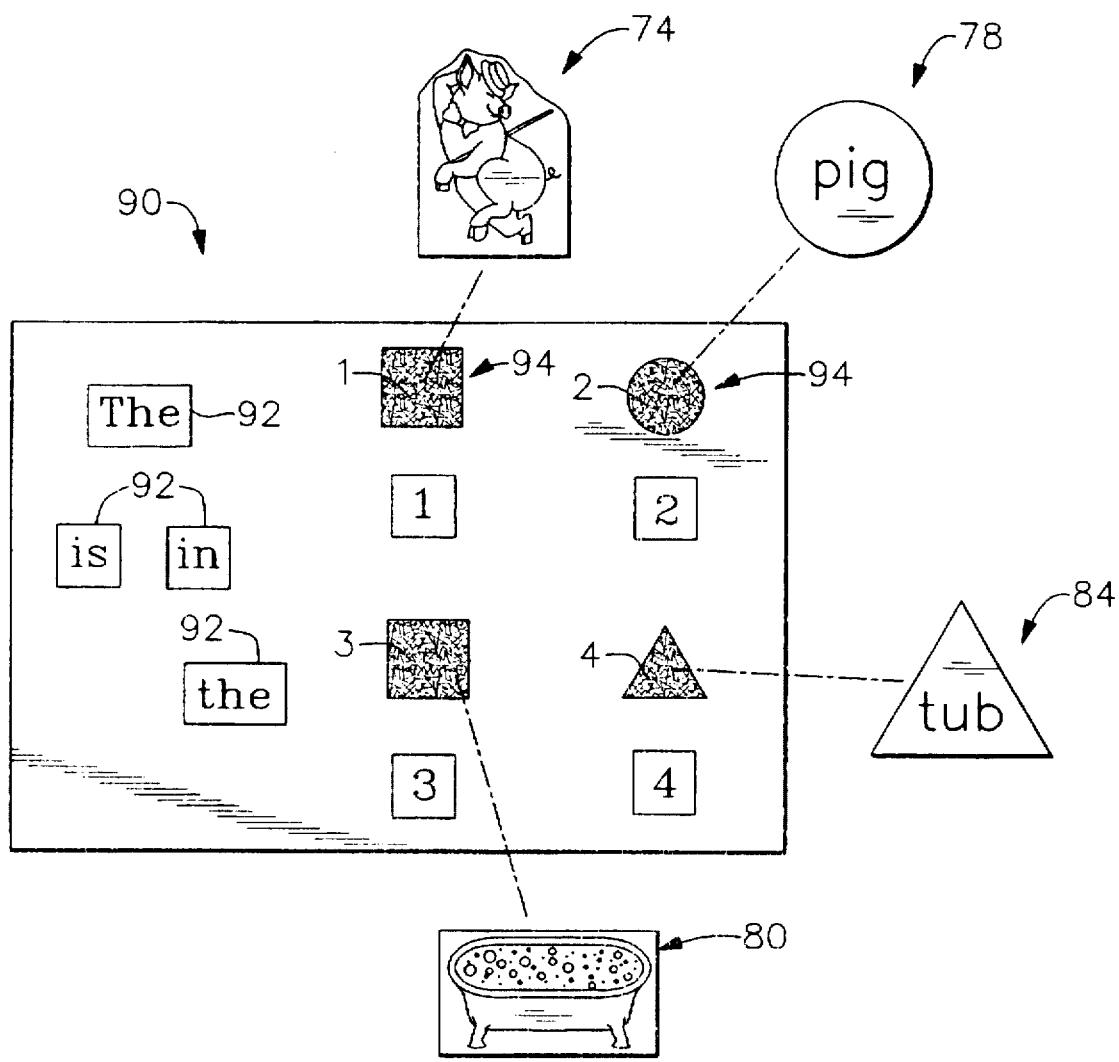
FIG. 9 is an exploded elevational view of the novel storyboard.

Each flap 62, 64, 66, and 68 is hingedly, i.e., foldably secured to the perimeter of said substrate 70 as depicted; it should be understood that said flaps are in their respective "open" configurations in FIG. 8. The folding lines are collectively denoted 63.

An elongate strip of hook and loop fastening material 72 is mounted to flat substrate 70 adjacent a left edge thereof and is concealed when said first flap 62 is closed. A plurality of attractive picture-containing mounting members, collectively denoted 74, having a complementary hook and loop fastener on their respective reverse sides, are detachably secured to said elongate strip 72.

A second elongate strip of fastening material 76 is secured to substrate 70 under second flap 64, and a second plurality of mounting members 78 have complementary fastening material on their respective reverse sides to facilitate detachable engagement therewith. Significantly, all mounting members 78 disposed under second flap 64 are round, have a word imprinted on a first side 78a thereof, and a pictorial representation of that word on the reverse side 78b thereof (see FIG. 11).

Figure 12:
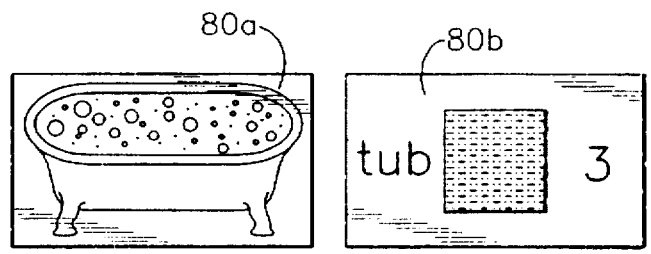
FIG. 12 is a composite view of the forward and reverse sides of a picture-containing mounting member of the second embodiment.

A second set of picture-bearing mounting members, collectively denoted 80, is detachably secured to a third elongate strip of fastening material 82 that is covered by third flap 66 when said third flap is closed. A pictorial figure is imprinted on a first side 80a thereof, and textual material is imprinted on reverse side 80b thereof (FIG. 12).

A second set of word-bearing mounting members, collectively denoted 84, is detachably secured to a fourth strip of fastening material 86 positioned beneath fourth flap 68 when said fourth flap is closed.

Figure 13:
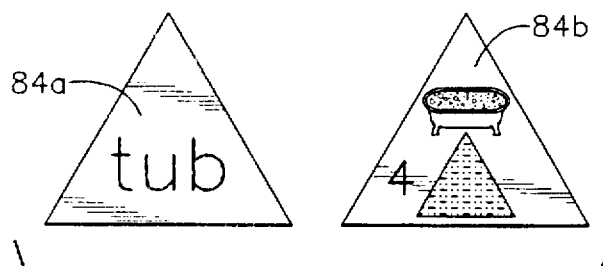
FIG. 13 is a composite view of the forward and reverse sides of a round word-containing mounting member of the second embodiment.

Each word of the second set of words 84 is imprinted on first side 84a of a triangular mounting means and a pictorial representation of the item represented by the word is provided on the reverse side 84b of said mounting member, as indicated in FIG. 13.

A storyboard 90 is detachably secured to substrate 70 by mating hook and loop fasteners, collectively denoted 91a, that are positioned at the four corners of the reverse side 90b of said storyboard and which releasably engage their counterparts 91b which are cooperatively positioned and secured to the front side of said substrate 70. In this way, a plurality of differing storyboards 90 may be provided.

As in the first embodiment, a sentence having permanent words 92 (see FIG. 9) and missing words 94 as a part thereof is imprinted on said substrate. In this illustrative example, the sentence includes two missing words, but there are a total of four pieces of hook and loop fasteners permanently secured to storyboard 90. The first piece, denoted 1, is square in configuration; the second piece, denoted 2, is round or circular in configuration; the third piece, denoted 3, is square; and the fourth piece, denoted 4, is triangular.

Picture-containing mounting members 74 and 80, such as may be found under flaps 62 and 66, respectively, are always detachably secured to the hook and loop fasteners denoted 1 and 3. The child is taught this by the teacher, but the word "Pictures" on flaps 62 and 66 is imprinted on a rectangular background as indicated in FIG. 8, and flaps 62 and 66 are further denoted as flaps 1 and 3, respectively so that the child will understand that the figures found under flap 1 will be attached to the hook and loop fastener denoted 1 on storyboard 90, and that the figures found under flap 3 will be attached to the hook and loop fastener denoted 3 on storyboard 90.

Similarly, the child will understand, as taught by the teacher, that the words found under flaps 64 and 68, which are respectively denoted 2 and 4 on the depicted commercial embodiment of the invention, will be attached to the round fastener denoted 2 on storyboard 90 and the triangular fastener denoted 4 on storyboard 90, respectively.

To teach a child how to use the device, a teacher instructs the child to open flap 62 (denoted 1 in the depicted commercial embodiment) and to place a pictorial mounting member 74 found thereunder onto the square fastener denoted 1 on storyboard 90. The child is then instructed to open second flap 64, denoted 2 in the commercial embodiment, and to find the round mounting member 78 having a word on the first side 78a thereof that represents the item pictorially depicted in the space numbered 1. Thus, if the child selected a pictorial representation of a pig from among the figures detachably secured to elongate strip 72 under flap 1, then the child's challenge is to find the round mounting member 78 under flap 2 having the word "pig" imprinted thereon and to place said mounting member on the round fastener denoted 2 on storyboard 90.

The child is then instructed to select a mounting member bearing a picture from the group of mounting members detachably secured to third elongate strip 82 and to place said mounting member on the square fastener denoted 3. The child then is instructed to lift flap 4 and to find the mounting member having a word that represents that picture. If the child selected a picture of a bathtub, for example, from the pictorial mounting members 80 positioned under flap 3, the child needs to find the word "tub" imprinted on one of the mounting members 84 positioned under flap 4.

Figure 10:
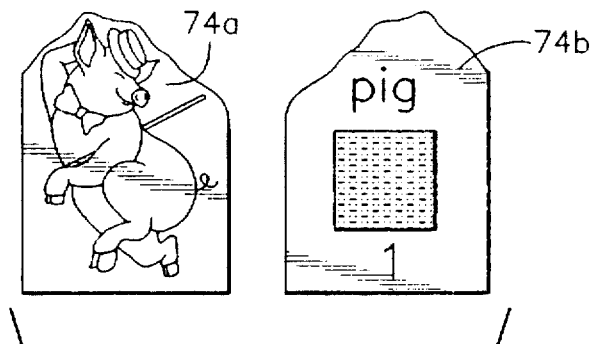
FIG. 10 is a composite view of the forward and reverse sides of a picture-containing mounting member of the second embodiment.
Figure 11:
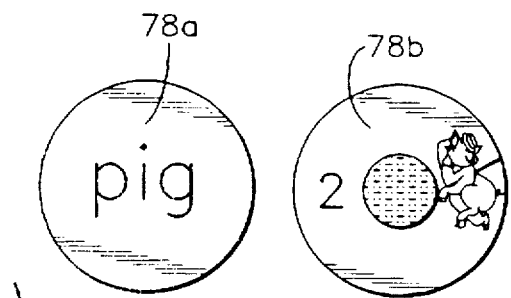
FIG. 11 is a composite view of the forward and reverse sides of a round word-containing mounting member of the second embodiment.

The adult then reads the sentence with the child: "The pig is in the tub." The whimsical pictures and the universe of available words used with the inventive game may be selected for their humorous potential; this encourages repeated use of the novel apparatus. The child is then instructed to sequentially invert each of the mounting members. As indicated in FIG. 10, upon inverting mounting member 74 at space 1, the child reads the word "pig." Upon inverting mounting member 78 occupying space 2, the child sees a pictorial representation of a pig. Upon inverting mounting member 80 in space 3, the child sees the word "tub" and upon inverting mounting member 84 at space 4, the child sees a pictorial representation of a bathtub. Thus, the inversion process reinforces what the child has learned. The child is eager to invert the pieces because he or she enjoys the sound and feel of separating the hook and loop fasteners from one another. He or she also is eager to read the word or see the picture on the reverse side of the mounting member to verify that the picture or word on the first side, respectively, was correctly understood.

After the adult has guided the child through the process one or more times, the child will comprehend how to use the novel device and will use it at great length until it has been mastered. As mentioned earlier, additional storyboards 90 and additional pictures and words are provided as well so that the child may learn to read thousands of words in a way that is fun.

A common element of both embodiments of this invention is that the child is physically involved in the reading process, i.e., the learning process is not entirely mental. Another common element is the reversability of the mounting members that provides verification or correction of a child's understanding of a word.

The child may also be taught how to repeat a completed sentence in sign language; the signing adds another physical step to keep the child interested in the learning process and serves to further reinforce the reading skills acquired by playing with novel device 10.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for teaching reading skills, comprising the steps of:

imprinting a partial sentence on a substrate;

said partial sentence having at least two omitted words;

permanently affixing two fastening means on said substrate at the location of said at least two omitted words;

shaping each of said two permanently affixed fastening means to have a predetermined geometrical shape, each of which is different from the other so that there is a first permanently affixed fastening means having a first predetermined shape and a second permanently affixed fastening means having a second predetermined shape;

providing a plurality of mounting members;

shaping a first half of said mounting members to have a common, first predetermined shape that matches the shape of said first permanently affixed fastening means and shaping a second half of said mounting members to have a common, second predetermined shape that matches the shape of said second permanently affixed fastening means;

providing a fastening means on a second side of each of said mounting members that is adapted for detachable engagement with said permanently affixed first and second fastening means;

imprinting a first predetermined indicia on respective first sides of said first half of mounting members and imprinting a second predetermined indicia on respective first sides of said second half of mounting members so that said first and second indicia collectively grammatically complete said partial sentence when a mounting member preselected from said first half of mounting members is detachably secured to said first permanently affixed fastening means and when a mounting member preselected from said second half of mounting members is detachably secured to said second permanently affixed fastening means;

storing said first and second halves of mounting members at a location remote from said partial sentence so that a child learning to read must first retrieve a first selected mounting member from said first half of mounting members from said remote location prior to detachably securing said first selected mounting member to said first permanently affixed fastening means and so that said child must retrieve a second selected mounting member from said second half of mounting members from said remote location to detachably secure said second selected mounting member to said second permanently affixed fastening means;

whereby the different shapes of the permanently affixed fastening means suggest to said child that a mounting member selected from the first half of mounting members should be detachably secured to said first permanently affixed fastening means and that a mounting member selected from the second half of mounting members should be detachably secured to said second permanently affixed fastening means.

2. The method of claim 1, further comprising the step of providing on said respective second sides of said first half of mounting members a third predetermined indicia that carries information confirming said first predetermined indicia, said third predetermined indicia being in a different form than said first predetermined indicia and providing on said respective second sides of said second half of mounting members a fourth predetermined indicia that carries information confirming said second predetermined indicia, said fourth predetermined indicia being in a form different than said second predetermined indicia.

3. The method of claim 2, wherein the first predetermined indicia is pictorial wherein the second predetermined indicia is printed matter, wherein the third predetermined indicia is printed matter and the fourth predetermined indicia is pictorial.

4. An apparatus for teaching reading skills, comprising:

a substrate having a flat structure;

a plurality of flap members hingedly mounted to said substrate, at a perimeter thereof;

a plurality of elongate fastening means secured to said substrate, inwardly of said perimeter, each of said elongate fastening means being concealed by an associated flap member when said associated flap member is in a folded position and each of said elongate fastening means being visible when said associated flap means is in an unfolded position;

a first plurality of mounting members having a first predetermined indicia imprinted on a first side thereof and having a complemental fastening means secured to a reverse side thereof, said first plurality of fastening members being detachably secured to a first elongate fastening means of said plurality of elongate fastening means;

a second plurality of mounting members having a second predetermined indicia imprinted on a first side thereof and having a complemental fastening means secured to a reverse side thereof, said second plurality of fastening members being detachably secured to a second elongate fastening means of said plurality of elongate fastening means;

a third plurality of mounting members having a third predetermined indicia imprinted on a first side thereof and having a complemental fastening means secured to a reverse side thereof, said third plurality of fastening members being detachably secured to a third elongate fastening means of said plurality of elongate fastening means;

a fourth plurality of mounting members having a fourth predetermined indicia imprinted on a first side thereof and having a complemental fastening means secured to a reverse side thereof, said fourth plurality of fastening members being detachably secured to a fourth elongate fastening means of said plurality of elongate fastening means;

a storyboard detachably secured to said substrate;

a partial sentence imprinted on said storyboard, said sentence having at least two omitted words;

at least two fastening means secured to said substrate in registration with each of said at least two missing words;

whereby said partial sentence is completed by removing a first preselected mounting member from said first elongate fastening means and detachably securing said first preselected mounting member to a first fastening means associated with a first omitted word, by removing a second preselected mounting member from said second elongate fastening means and detachably securing said second preselected mounting member to a second fastening means associated with said first omitted word, by removing a third preselected mounting member from a third elongate fastening means and detachably securing said third preselected mounting member to a first fastening means associated with a second omitted word, and by removing a fourth preselected mounting member from said fourth elongate fastening means and detachably securing said fourth preselected mounting member to a second fastening means associated with said second omitted word;

whereby a plurality of differing storyboards are detachably secured to said substrate; and whereby a plurality of differing mounting members are detachably secured to said respective elongate fastening means so that the number of partial sentences that may be completed is unlimited.

5. The apparatus of claim 4, wherein said first and third mounting members include pictorial information on a first side thereof and wherein said second and fourth mounting members include textual information on a first side thereof.

6. The apparatus of claim 5, wherein said first and third mounting members include textual information on a reverse side thereof that confirms said pictorial information on said first side thereof and wherein said second and fourth mounting members include pictorial information on a reverse side thereof that confirms said textual information on said first side thereof.

7. An apparatus for teaching reading skills, comprising:

a book means having a front cover and a back cover;

a plurality of fastening means permanently affixed to an inside surface of said front cover;

a plurality of mounting members including a first half of mounting members and a second half of mounting members, said first half of mounting members having a first predetermined indicia on a first side thereof and having a complemental fastening means secured to a reverse side thereof and said second half of mounting members having a second predetermined indicia on a first side thereof and having a complemental fastening means secured to a reverse side thereof;

a partial sentence imprinted on an inside surface of said back cover, said partial sentence having at least two omitted words;

at least two complemental fastening means permanently affixed to said inside surface of said back cover in registration with said at least two missing words;

each mounting member of said first half of mounting members having a third predetermined indicia imprinted upon said reverse side thereof and each mounting member of said second half of mounting members having a fourth predetermined indicia imprinted upon said reverse side thereof;

each of said two permanently affixed fastening means on said inside surface of said back cover having a predetermined geometrical shape, each of which is different from the other so that there is a first permanently affixed fastening means having a first predetermined shape and a second permanently affixed fastening means having a second predetermined shape;

said first half of mounting members having a common, first predetermined shape that matches the shape of said first permanently affixed fastening means and said second half of mounting members having a common, second predetermined shape that matches the shape of said second permanently affixed fastening means;

a fastening means provided on a second side of each of said mounting members that is adapted for detachable engagement with said permanently affixed first and second fastening means;

a first predetermined indicia imprinted on respective first sides of said mounting members of said first half of mounting members and a second predetermined indicia imprinted on respective first sides of said second half of mounting members so that said first and second indicia collectively grammatically complete said partial sentence when a mounting member preselected from said first half of mounting members is detachably secured to said first permanently affixed fastening means and when a mounting member preselected from said second half of mounting members is detachably secured to said second permanently affixed fastening means;

said first and second halves of mounting members positioned at a location remote from said partial sentence so that a child learning to read must first retrieve a first selected mounting member from said first half of mounting members from said remote location prior to detachably securing said first selected mounting member to said first permanently affixed fastening means and so that said child must retrieve a second selected mounting member from said second half of mounting members from said remote location to detachably secure said second selected mounting member to said second permanently affixed fastening means;

whereby the different shapes of the permanently affixed fastening means on said inside surface of said back cover suggest to said child that a mounting member selected from the first half of mounting members should be detachably secured to said first permanently affixed fastening means and that a mounting member selected from the second half of mounting members should be detachably secured to said second permanently affixed fastening means.

8. The apparatus of claim 7, further comprising a third predetermined indicia on said second side of said first half of mounting members that carries information confirming said first predetermined indicia, said third predetermined indicia being in a different form than said first predetermined indicia, and a fourth predetermined indicia on said second side of said second half of mounting members that carries information confirming said second predetermined indicia, said fourth predetermined indicia being in a form different than said second predetermined indicia.

9. The apparatus of claim 8, wherein the first predetermined indicia is pictorial, wherein the second predetermined indicia is printed matter, wherein the third predetermined indicia is printed matter and wherein the fourth predetermined indicia is pictorial.

* * * * *